United States Patent
Schaeflein et al.

(10) Patent No.: US 9,732,623 B2
(45) Date of Patent: Aug. 15, 2017

(54) CHARGING DEVICE AND ASSOCIATED OPERATING METHOD

(75) Inventors: Jochen Schaeflein, Stuttgart (DE); Dirk Naunheim, Stuttgart (DE)

(73) Assignee: Bosch Mahle Turbo Systems GmbH & Co. KG, Stuttgart (DE)

( * ) Notice: Subject to any disclaimer, the term of this patent is extended or adjusted under 35 U.S.C. 154(b) by 927 days.

(21) Appl. No.: 14/111,563

(22) PCT Filed: Mar. 2, 2012

(86) PCT No.: PCT/EP2012/053607
§ 371 (c)(1),
(2), (4) Date: Dec. 30, 2013

(87) PCT Pub. No.: WO2012/139816
PCT Pub. Date: Oct. 18, 2012

(65) Prior Publication Data
US 2014/0127004 A1    May 8, 2014

(30) Foreign Application Priority Data
Apr. 13, 2011  (DE) ........................ 10 2011 007 279

(51) Int. Cl.
*F01D 17/16*  (2006.01)
*F01D 17/20*  (2006.01)
(Continued)

(52) U.S. Cl.
CPC ........... *F01D 17/162* (2013.01); *F01D 17/20* (2013.01); *F02B 37/186* (2013.01); *F02B 37/24* (2013.01);
(Continued)

(58) Field of Classification Search
CPC ........ F01D 17/00; F01D 17/10; F01D 17/105; F01D 17/12; F01D 17/14; F01D 17/141;
(Continued)

(56) References Cited

U.S. PATENT DOCUMENTS

| 4,955,788 A | 9/1990 | Kimura et al. |
| 6,397,597 B1 | 6/2002 | Gartner |

(Continued)

FOREIGN PATENT DOCUMENTS

| DE | 19858293 C1 | 3/2000 |
| DE | 10035762 A1 | 1/2002 |

(Continued)

OTHER PUBLICATIONS

English abstract for DE-60216696.
English abstract for DE-102008049005.
German Search Report for DE102011007279.9.

*Primary Examiner* — Richard Edgar
(74) *Attorney, Agent, or Firm* — Fishman Stewart PLLC

(57) ABSTRACT

A charging device for an exhaust gas turbocharger of an internal combustion engine may include at least one variable turbine and compressor geometry and an adjusting device for adjusting the at least one variable turbine and compressor geometry. The adjusting device may include a minimum set limit, which defines a minimum set flow of the at least one variable turbine and compressor geometry for an exhaust gas driving the charging device, and a maximum set limit, which defines a maximum set flow of the at least one variable turbine and compressor geometry for the exhaust gas driving the charging device. The adjusting device may be designed such that at least one minimum set limit of the adjusting device and the maximum set limit of the adjusting dive are variably adjustable and readjustable.

19 Claims, 1 Drawing Sheet

(51) Int. Cl.
  *F02B 37/18*   (2006.01)
  *F02B 37/24*   (2006.01)
(52) U.S. Cl.
  CPC ......... *F05D 2220/40* (2013.01); *Y02T 10/144* (2013.01)
(58) Field of Classification Search
  CPC .... F01D 17/143; F01D 17/145; F01D 17/146; F01D 17/148; F01D 17/16; F01D 17/162; F01D 17/165; F01D 17/167; F01D 17/20; F02B 37/186; F02B 37/24
  See application file for complete search history.

(56) References Cited

U.S. PATENT DOCUMENTS

| | | |
|---|---|---|
| 6,546,728 B2 | 4/2003 | Schmidt et al. |
| 7,805,938 B2 | 10/2010 | Roh |
| 2009/0123272 A1* | 5/2009 | Love ................ F01D 17/165 415/148 |
| 2013/0056325 A1 | 3/2013 | Ammon |

FOREIGN PATENT DOCUMENTS

| | | |
|---|---|---|
| DE | 60216696 T2 | 10/2007 |
| DE | 102007051329 A1 | 5/2008 |
| DE | 102008049005 A1 | 4/2010 |
| DE | 102010020026 A1 | 11/2011 |
| EP | 0247905 A2 | 12/1987 |
| EP | 1304462 A2 | 4/2003 |
| EP | 1491743 A1 | 12/2004 |
| EP | 2067957 A2 | 6/2009 |
| WO | WO-2008/011355 A1 | 1/2008 |
| WO | WO-2009/102546 A1 | 8/2009 |

* cited by examiner

CHARGING DEVICE AND ASSOCIATED OPERATING METHOD

CROSS REFERENCE TO RELATED APPLICATIONS

This application claims priority to German Patent Application 10 2011 007 279.9, filed on Apr. 13, 2011, and International Patent Application No. PCT/EP2012/053607 filed on Mar. 2, 2012, the contents of which are hereby incorporated by reference in their entirety.

TECHNICAL FIELD

The present invention relates to a charging device, in particular to an exhaust gas turbocharger of an internal combustion engine, with a variable turbine or compressor geometry according to the preamble of claim 1. The invention furthermore relates to a method for operating such a charging device.

BACKGROUND

To increase the performance of an engine, in particular an internal combustion engine, these frequently have a charging device, in particular an exhaust gas turbocharger. As a result, exhaust gas of the internal combustion engine is fed to a turbine of the charging device. The charging device, furthermore, comprises a shaft, which couples the turbine to a compressor. Thus, the exhaust gas drives the turbine which through the shaft drives the compressor, which in turn compresses air to be fed to the internal combustion engine, thus increasing the performance of the internal combustion engine. To vary the performance of the charging device and in particular to increase the performance of the charging device at low rotational speeds of the internal combustion engine, the charging device usually has a variable turbine or compressor geometry with guide blades, which depending on position, make available a cross section for the driving exhaust gas. The position of the guide blades in the process is changed through an adjusting device, which as a rule has mechanical limits, which define a minimum set flow and a maximum set flow of the driving exhaust gas. In the process, these limits, in particular the minimum set limit and thus the minimum set flow have a major influence on the performance of the charging device. Disadvantageous with such a charging device is that the mechanical limits change, in particular through wear. Because of this, the performance of the charging device is reduced and/or the adjusting of the guide blades imprecise.

SUMMARY

The present invention therefore deals with the problem of stating an improved or at least alternative embodiment for a charging device of the generic type, which is characterized in particular by a precise adjustability of the guide blades.

According to the invention, this problem is solved through the subjects of the independent claims. Advantageous embodiments are subject of the dependent claims.

The present invention is based on the general idea of designing the adjusting device with a charging device, in particular an exhaust gas turbocharger of an internal combustion engine, with a variable turbine or compressor geometry and an adjusting device, wherein the adjusting device adjusts the variable turbine or compressor geometry, and in particular comprises a minimum limit, which finds a minimum set flow of the variable turbine or compressor geometry for an exhaust gas driving the charging device, and/or the adjusting device comprises a maximum set limit, which defines a maximum set flow of the variable turbine or compressor geometry for the exhaust gas driving the charging device, in such a way that a minimum set limit and/or the maximum set limit is/are adjustable. The minimum set limit and/or the maximum set limit of the adjusting device are thus in particular variable and thus readjustable. According to the inventive idea, the adjusting device comprises an actuator, by means of which the guide blades of the variable turbine or compressor geometry are moved. The adjusting device is now designed in such a manner that it takes into account a position of the actuator, which corresponds to the minimum set limit and thus the minimum set flow of the variable turbine or compressor geometry. Alternatively or additionally, the adjusting device takes into account another position of the actuator which corresponds to the maximum set limit and thus the maximum set flow of the variable turbine or compressor geometry. Here, the actuator is moved between the two positions and does not exceed these. If only one of these positions is present, this position is not correspondingly exceeded. The adjusting device, furthermore, is designed such that mentioned limit positions of the actuator are adjustable. The limit positions are thus in particular variable and thus for example readjustable in the case of wear. Thus, the adjusting device allows in particular adapting the respective limit positions to the desired minimum set flow or maximum set flow.

In a further embodiment, the adjusting device additionally comprises a mechanical minimum stop, which defines a minimum flow of the variable turbine or compressor geometry. This is realised for example through a stop on the actuator or an actuator lever. Alternatively or additionally, the adjusting device comprises a mechanical maximum stop, which defines a maximum flow of the variable turbine or compressor geometry. This is likewise realised in particular through a corresponding stop on the actuator or on the actuator lever. For the minimum stop it is true that it defines a minimum flow of the exhaust gas driving the variable turbine or compressor geometry, wherein the minimum flow defines the lowermost limit of the minimum set flow. Accordingly, it is true for the maximum stop that it defines a maximum flow of the exhaust gas driving the variable turbine or compressor geometry, wherein the maximum flow defines an uppermost limit of the maximum set flow. This is to ensure in particular that damaging positions of the guide blades are avoided and/or prevent that those damaging the charging device or the internal combustion engine are reached.

According to an advantageous use of the charging device and of the exemplarily shown embodiments, the adjusting device can now be programmed so that it can realise the operating method described in the following.

With the method, an associated aerodynamic minimum set flow through the variable turbine or compressor geometry is defined in a first step at different positions of the variable turbine or compressor geometry. With the method, the position of the variable turbine or compressor geometry can in particular be changed in predetermined steps and in the respective positions of the variable turbine or compressor geometry, a corresponding aerodynamic minimum set flow measured. Alternatively or additionally the method defines an aerodynamic maximum set flow of the variable turbine or compressor geometry, wherein this definition can be measured corresponding to the above description. For this definition one is able to assign a corresponding adjusting value of the adjusting device to a target value of the aerodynamic minimum set flow. Accordingly, the method assigns a corresponding adjusting value to a target value of the aerodynamic maximum set flow. Here, these adjusting values correspond to the minimum set limit or maximum set limit of the adjusting device. These adjusting values and optionally the corresponding target values are now fed to a control unit, in particular an engine control unit in the case of a self-locking adjusting device during or after the installation of the charging device in an internal combustion engine. In the process, the engine control unit can for example read out the corresponding values and optionally the associated target values. In the case of long-self-locking adjusting devices it is conceivable to capture the adjusting values and optionally the associated target values by means of a marking so that these can be used during the further course. Here, reference is made to a data matrix code (DMC) as examples for such a marking.

On an advantageous use of a charging device according to the invention, a comparison between the aerodynamic flow and the minimum set flow corresponding to the current adjusting value of the adjusting device takes place during the operation of the internal combustion engine. This set-actual value comparison in this case can take place at regular time intervals or as an alternative, continuously. Accordingly, a set-actual value comparison between an aerodynamic flow measured at a given adjusting value and a maximum set flow corresponding to this adjusting value can be carried out. If the measured flow deviates from the minimum set flow or maximum set flow assigned to this adjusting value, the position of the adjusting device is changed so that the measured flow corresponds to the minimum set flow or maximum set flow and this position is captured as new adjusting value. The method therefore changes in particular the minimum set limit or the maximum set limit of the adjusting device. Thus it is now possible in particular to prevent or at least to reduce deviations of the minimum set flow and/or the maximum set flow which occur for example through wear by adapting the corresponding minimum set limit or maximum set limit of the adjusting device.

In an advantageous embodiment of the method, the minimum set flow and/or the maximum set flow of the variable turbine or compressor geometry is/are changed dependent on characteristics of the charging device. A rotational speed of a turbine of the charging device, which for example can be measured by means of a sensor is pointed out here as an example of such a characteristic of the charging device. In this case, the minimum set flow or maximum set flow changes and thus the associated adjusting value of the adjusting device, i.e. in particular the minimum set limit or the maximum set limit, depending on the rotational speed of the turbine. This means that different rotational speeds or rotational speed ranges of the turbine are assigned different minimum set flows or maximum set flows and thus adjusting values, in particular minimum set limits and the maximum set limits. Alternatively or additionally, the minimum set flow and/or the maximum set flow can be changed through the method as a function of characteristics of the internal combustion engine. A charging pressure of the air to be fed to the internal combustion engine is pointed out here as an example for such a characteristic of the internal combustion engine. Here, different minimum set flows and maximum set flows and thus adjusting values of the adjusting device, in particular minimum set limits and the maximum set limits are in particular assigned to different charging pressures or charging pressure ranges.

The minimum set flow and/or the maximum set flow of the variable turbine or compressor geometry as well as the corresponding adjusting values of the adjusting device are stored in the form of characteristic curves or characteristic diagrams in an advantageous embodiment. If a plurality of minimum set flows and/or maximum set flows, for example as a function of characteristics of the charging device and/or of the internal combustion engine is present, their storing in the form of characteristics and families of characteristics can also be realised. In the process, adjusting the minimum set flow and maximum set flow takes place by means of the characteristics and families of characteristics. Feeding the minimum set flow and/or maximum set flow and the associated adjusting value to a control unit, in particular the engine control unit, by means of the characteristics and families of characteristics is also possible.

With a further advantageous embodiment of the method, the characteristic curves or characteristic diagrams are defined on the passing of predetermined parameters of the internal combustion engine and/or the charging device. Practically, such a definition is to be carried out for the first time with the charging device in a state as new. In the process, minimum set flows and/or maximum set flows are measured in different positions of the variable turbine or compressor geometry, also as a function of characteristics of the charging device, and thus adjusting values of the adjusting device for target values of the minimum set flow and/or maximum set flow defined. This process can for example be repeated at regular intervals, wherein the corresponding characteristic curves or characteristic diagrams are changed if appropriate. In the process, the characteristics of families of characteristics can alternatively or additionally have a dependency on characteristics of the internal combustion engine. The method serves in particular for the purpose of avoiding or at least reducing a deviation of the minimum set flow and/or maximum set flow of the variable turbine or compressor geometry from the corresponding target value or the corresponding target values which occurs for example through wear by adapting the minimum set limit and/or maximum set limit.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves, without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
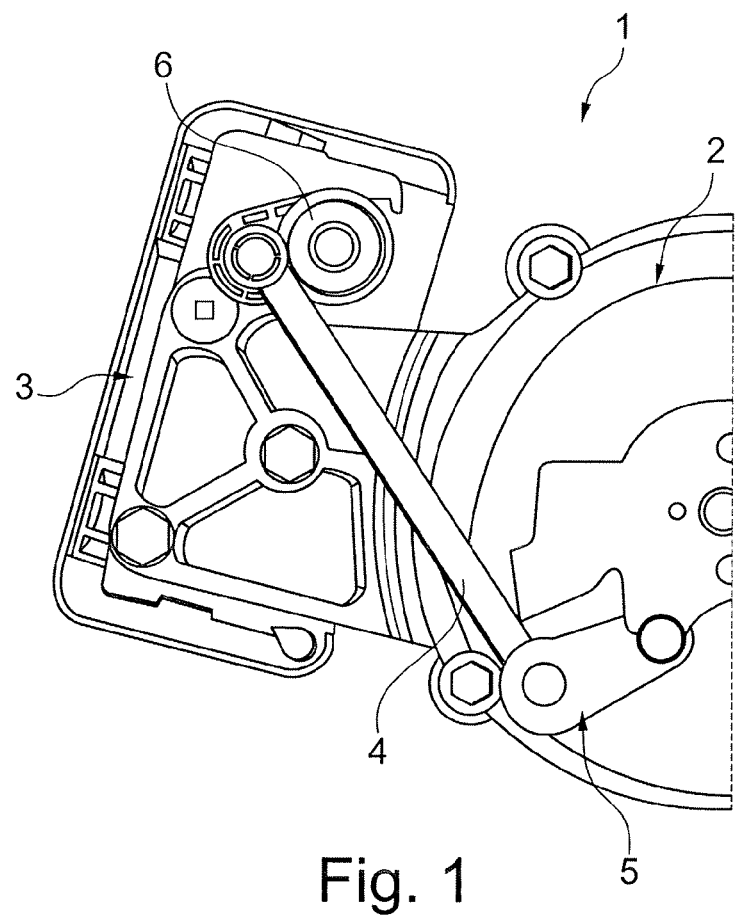
FIG. 1 a top view of a charging device,
FIG. 2 a flow diagram for explaining a method according to the invention.

According to FIG. 1, a charging device 1 has a variable turbine or compressor geometry 2, which is adjusted by an adjusting device 3. In the embodiment shown here, the adjusting device 3 comprises an actuator 4, which is coupled to the variable turbine or compressor geometry 2 by means of an actuator lever 5. The adjusting device 3 is furthermore connected to the actuator 4 through an adjusting lever 6, by means of which the adjusting device 3 transmits a movement of the actuator 4 to the variable turbine or compressor geometry 2. This movement leads to a rotation of guide blades of the variable turbine or compressor geometry 2, wherein the guide blades through their position define the flow of an exhaust gas driving the charging device 1. The adjusting device 3, furthermore, is designed such that it has a minimum set limit which defines a minimum set flow of the variable turbine or compressor geometry 2. In addition, the adjusting device 3 has a maximum set limit, which defines a maximum set flow of the variable turbine or compressor geometry 2. The adjusting device 3 is designed furthermore such that the minimum set limit and the maximum set limit are variably adjustable. The minimum set limit and the maximum set limit of the adjusting device 3 are thus in particular readjustable, by means of which for example an adaptation of the minimum set limit and the maximum set limit to predetermined minimum set flows and maximum set flows is realised. The adjusting device 3 of the charging device 1 is thus able in particular to offset deviations of the minimum set limit and the maximum set limit from the associated minimum set flow and maximum set flow which occur through wear.

Figure 2:
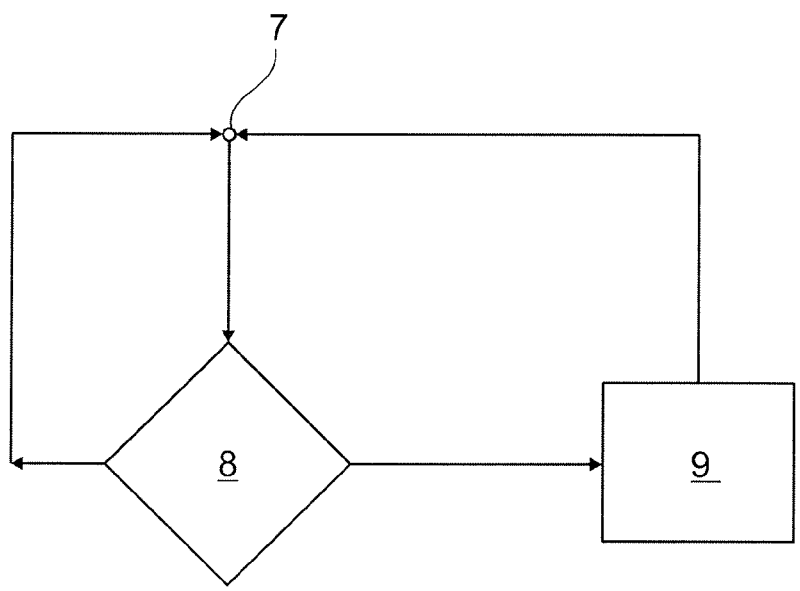

To realise such an adaptation of the minimum set limit and the maximum set limit of the adjusting device 3 to the minimum set flow and maximum set flow of the variable turbine or compressor geometry 2, the procedure corresponding to FIG. 2 is followed according to an advantageous embodiment.

The method according to the invention starts at a starting point 7 and leads to a comparison section 8. In the comparison section 8, a comparison between a currently measured aerodynamic flow of the variable turbine or compressor geometry 2 with the target value of the minimum set flow and maximum set flow of the variable turbine or compressor geometry 2 assigned to the current adjusting value of the adjusting device 3 corresponds to the aerodynamic flow measured at this adjusting value. Upon a deviation of the currently measured aerodynamic flow of the variable turbine or compressor geometry 2 from the target value of the minimum set flow or maximum set flow of the variable turbine or compressor geometry 2 assigned to the current adjusting value of the adjusting device 3, the current adjusting value of the adjusting device 3 is changed in an operation step 9 until an adaptation of the measured aerodynamic flow of the variable turbine or compressor geometry 2 to the target value of the minimum set flow or maximum set flow of the variable turbine or compressor geometry 2 is reached. Following this, the position of the adjusting device 3 reached after the adaptation is assigned and captured as new adjusting value of the adjusting device 3 of the minimum set flow or maximum set flow of the variable turbine or compressor geometry 2. The changes of the position of the adjusting device 3 in this case can be carried out in a stepless or stepped manner. The respective steps of the changes in this case can in particular depend on the deviation between the currently measured aerodynamic flow and the minimum set flow or maximum set flow. Changes as a function of external parameters, in particular of parameters of an internal combustion engine driving the charging device 1, are also conceivable.

It is practical, furthermore, to carry out an adaptation of the adjusting value of the adjusting device 3 when a set deviation between the currently measured aerodynamic flow of the variable turbine or compressor geometry 2 from the minimum set flow or maximum set flow of the variable turbine or compressor geometry 2 assigned to this adjusting value is determined. Because of this, a frequent adaptation of the adjusting value of the adjusting device 3 is avoided in particular and an oscillating behaviour that may occur through the internal combustion engine taken into account. Following the carrying out of operation step 9, the method returns to the starting point 7 and the method is repeated. If in the comparison section 8 no deviation is determined between the currently measured aerodynamic flow of the variable turbine or compressor geometry 2 and the minimum set flow or maximum set flow of the variable turbine or compressor geometry 2 assigned to the current adjusting value is determined or if the deviation is below the set deviation, the method returns to the starting point 7 and the method is repeated.

It is pointed out that the adaptation of the adjusting value of the adjusting device 3 to the minimum set flow of the variable turbine or compressor geometry 2 and the adaptation of the adjusting value of the adjusting device 3 to the maximum set flow of the variable turbine or compressor geometry 2 can proceed in separate operation steps each and lead to the same result. Such a method is therefore likewise scope of this invention.

The invention claimed is:

1. A method for adjusting a charging device for an exhaust gas turbocharger of an internal combustion engine, comprising:
   providing at least one of a variable turbine and compressor geometry;
   measuring at least one of an aerodynamic minimum set flow and an aerodynamic maximum set flow through the at least one variable turbine and compressor geometry in different positions of an adjusting device, the adjusting device configured for adjusting the at least one variable turbine and compressor geometry;
   determining an adjusting value of the adjusting device corresponding to a target value of the at least one of the aerodynamic minimum set flow and the aerodynamic maximum set flow;
   wherein the adjusting value is determined by one of an engine control unit after the installation of the charging device in an internal combustion engine in the case of a self-locking adjusting device, and a marking in the case of a non-self-locking adjusting device;
   performing a set-actual value comparison with respect to the adjusting value corresponding to the at least one of the aerodynamic minimum set flow and the aerodynamic maximum set flow during operation of the internal combustion engine;
   upon a predefined set-actual value deviation, adjusting the adjusting device in response to the predefined set-actual value deviation; and
   changing at least one of the aerodynamic minimum set flow and the aerodynamic maximum set flow of the at least one of the variable turbine and compressor geometry in response to characteristics of at least one of the internal combustion engine and the charging device, the characteristics of the internal combustion engine including at least a charging pressure of the air to be fed to the internal combustion engine and the characteristics of the charging device including at least a rotational speed of a turbine.

2. The method according to claim 1, wherein the characteristics of the at least one of the internal combustion engine and the charging device are represented by one of a characteristic curve and a characteristic diagram.

3. The method according to claim 2, wherein the one of the characteristic curve and the characteristic diagram is defined on passing through predetermined parameters of at least one of the internal combustion engine and the charging device thereby defining corresponding minimum set flows and maximum set flows of at least one of the variable turbine and compressor geometry.

4. The method according to claim 1, wherein the adjusting value in the case of the non-self-locking adjusting device is determined via one of a colour marking and a data matrix code (DMC).

5. The method according to claim 1, wherein the at least one of the aerodynamic minimum set flow and the aerodynamic maximum set flow of the at least one of the variable turbine and compressor geometry is changed in response to the characteristics of the charging device, the characteristics of the charging device including at least the rotational speed of the turbine.

6. The method according to claim 5, wherein the characteristics of the charging device and the at least one of the aerodynamic minimum set flow and the aerodynamic maximum set flow of the at least one of the variable turbine and compressor geometry is represented by one of a characteristic curve and a characteristic diagram.

7. The method according to claim 6, wherein the one of the characteristic curve and the characteristic diagram is defined on passing through predetermined parameters of the charging device, thereby defining corresponding minimum set flows and maximum set flows of the at least one of the variable turbine and compressor geometry.

8. The method according to claim 1, wherein the at least one of the aerodynamic minimum set flow and the aerodynamic maximum set flow of the at least one of the variable turbine and compressor geometry is changed in response to the characteristics of the internal combustion engine, the characteristics of the internal combustion engine include a charging pressure of air to be fed to the internal combustion engine.

9. The method according to claim 8, wherein the characteristics of the internal combustion engine and the at least one of the aerodynamic minimum set flow and the aerodynamic maximum set flow of the at least one of the variable turbine and compressor geometry is represented by one of a characteristic curve and a characteristic diagram.

10. The method according to claim 9, wherein the one of the characteristic curve and the characteristic diagram is defined on passing through predetermined parameters of the internal combustion engine, thereby defining corresponding minimum set flows and maximum set flows of the at least one of the variable turbine and compressor geometry.

11. The method according to claim 1, wherein performing the set-actual value comparison includes comparing a measured aerodynamic flow of the at least one of the variable turbine and compressor geometry to the target valve of the at least one of the aerodynamic minimum set flow and the aerodynamic maximum set flow corresponding to the adjusting value of the adjusting device.

12. The method according to claim 1, wherein the predefined set-actual value deviation is represented by a deviation of a measured aerodynamic flow of the at least one of the variable turbine and compressor geometry from the target valve of the at least one of the aerodynamic minimum set flow and the aerodynamic maximum set flow corresponding to the adjusting value of the adjusting device.

13. A charging device for an exhaust gas turbocharger of an internal combustion engine programmed to realize the method of claim 1.

14. A method for adjusting a charging device for an exhaust gas turbocharger of an internal combustion engine, comprising:
providing at least one of a variable turbine and compressor geometry;
measuring at least one of an aerodynamic minimum set flow and an aerodynamic maximum set flow through the at least one variable turbine and compressor geometry in different positions of an adjusting device, the adjusting device configured for adjusting the at least one variable turbine and compressor geometry;
determining an adjusting value of the adjusting device corresponding to a target value of the at least one of the aerodynamic minimum set flow and the aerodynamic maximum set flow;
wherein the adjusting value is determined by one of an engine control unit after the installation of the charging device in an internal combustion engine in the case of a self-locking adjusting device, and a marking in the case of a non-self-locking adjusting device;
performing a set-actual value comparison with respect to the adjusting value corresponding to the at least one of the aerodynamic minimum set flow and the aerodynamic maximum set flow during operation of the internal combustion engine; and
upon a predefined set-actual value deviation, adjusting the adjusting device in response to the predefined set-actual value deviation;
wherein the adjusting value in the case of the non-self-locking adjusting device is determined via one of a colour marking and a data matrix code (DMC).

15. The method according to claim 14, changing at least one of the aerodynamic minimum set flow and the aerodynamic maximum set flow of the at least one of the variable turbine and compressor geometry in response to characteristics of at least one of the internal combustion engine and the charging device.

16. The method according to claim 15, wherein the at least one of the aerodynamic minimum set flow and the aerodynamic maximum set flow of the at least one of the variable turbine and compressor geometry is changed in response to characteristics of the charging device, the characteristics of the charging device including at least a rotational speed of a turbine.

17. The method according to claim 15, wherein the at least one of the aerodynamic minimum set flow and the aerodynamic maximum set flow of the at least one of the variable turbine and compressor geometry is changed in response to characteristics of the internal combustion engine, the characteristics of the internal combustion engine include a charging pressure of air to be fed to the internal combustion engine.

18. A charging device for an exhaust gas turbocharger of an internal combustion engine programmed to realize the method of claim 14.

19. A method for adjusting a charging device for an exhaust gas turbocharger of an internal combustion engine, comprising:
providing at least one of a variable turbine and compressor geometry;
measuring at least one of an aerodynamic minimum set flow and an aerodynamic maximum set flow through the at least one variable turbine and compressor geometry in different positions of an adjusting device, the adjusting device configured for adjusting the at least one variable turbine and compressor geometry;

determining an adjusting value of the adjusting device corresponding to a target value of the at least one of the aerodynamic minimum set flow and the aerodynamic maximum set flow;

wherein the adjusting value is determined by one of an engine control unit after the installation of the charging device in an internal combustion engine in the case of a self-locking adjusting device, and a marking in the case of a non-self-locking adjusting device;

performing a set-actual value comparison with respect to the adjusting value corresponding to the at least one of the aerodynamic minimum set flow and the aerodynamic maximum set flow during operation of the internal combustion engine;

upon a predefined set-actual value deviation, adjusting the adjusting device in response to the predefined set-actual value deviation;

changing at least one of the aerodynamic minimum set flow and the aerodynamic maximum set flow of the at least one of the variable turbine and compressor geometry in response to characteristics of at least one of the internal combustion engine and the charging device; and wherein the characteristics of the at least one of the internal combustion engine and the charging device and the at least one of the aerodynamic minimum set flow and the aerodynamic maximum set flow of the at least one of the variable turbine and compressor geometry is represented by one of a characteristic curve and a characteristic diagram.

* * * * *